(12) United States Patent
Koshiyama

(10) Patent No.: US 9,421,818 B2
(45) Date of Patent: Aug. 23, 2016

(54) BICYCLE HUB AND BICYCLE WHEEL

(71) Applicant: Shimano Inc., Sakai, Osaka (JP)

(72) Inventor: Kazuki Koshiyama, Osaka (JP)

(73) Assignee: Shimano Inc., Osaka (JP)

( * ) Notice: Subject to any disclaimer, the term of this patent is extended or adjusted under 35 U.S.C. 154(b) by 474 days.

(21) Appl. No.: 13/724,721

(22) Filed: Dec. 21, 2012

(65) Prior Publication Data
US 2014/0175859 A1    Jun. 26, 2014

(51) Int. Cl.
*B60B 1/04*    (2006.01)
*B60B 1/00*    (2006.01)

(52) U.S. Cl.
CPC .............. *B60B 1/041* (2013.01); *B60B 1/003* (2013.01); *B60B 1/042* (2013.01)

(58) Field of Classification Search
CPC ........... B60B 1/00; B60B 1/02; B60B 1/042; B60B 1/04
USPC .................................. 301/59, 55, 61, 56, 57
See application file for complete search history.

(56) References Cited

U.S. PATENT DOCUMENTS

| | | | |
|---|---|---|---|
| 686,463 A * | 11/1901 | Lee ........................... | B60B 9/20 152/58 |
| 2,040,541 A * | 5/1936 | Ash .................................. | 301/55 |
| 6,354,669 B1 | 3/2002 | Tabe | |
| 6,371,252 B1 | 4/2002 | Kanehisa | |
| 6,382,381 B1 | 5/2002 | Okajima et al. | |
| 6,409,278 B1 | 6/2002 | Nakajima | |
| 6,409,282 B1 | 6/2002 | Nakajima et al. | |
| 6,431,658 B1 | 8/2002 | Nakajima et al. | |
| 6,588,853 B2 * | 7/2003 | Okajima ............... | B60B 1/0223 29/894.33 |
| 6,692,086 B2 | 2/2004 | Okajima et al. | |
| 7,306,292 B2 | 12/2007 | Muraoka et al. | |
| 7,360,847 B2 | 4/2008 | Okajima et al. | |
| 7,374,251 B2 | 5/2008 | Okajima et al. | |
| 7,621,601 B2 | 11/2009 | Chiang | |
| 7,631,945 B2 * | 12/2009 | Addink ................. | B60B 1/0261 301/104 |
| 7,735,936 B2 * | 6/2010 | Passarotto ............... | B60B 1/003 29/894.345 |
| 8,528,991 B2 * | 9/2013 | Schlanger ............... | B60B 1/003 301/55 |
| 8,657,387 B2 * | 2/2014 | Schlanger ............... | B60B 1/003 301/104 |
| 2001/0054840 A1 * | 12/2001 | Schlanger ............... | B60B 1/003 301/59 |
| 2006/0267398 A1 * | 11/2006 | Muraoka ................. | B60B 1/042 301/105.1 |
| 2010/0301662 A1 * | 12/2010 | Schlanger ............... | B60B 1/003 301/58 |

FOREIGN PATENT DOCUMENTS

GB         000325106 A *   2/1929 ............... B60B 1/02

* cited by examiner

*Primary Examiner* — S. Joseph Morano
*Assistant Examiner* — Jean Charleston
(74) *Attorney, Agent, or Firm* — Global IP Counselors

(57) ABSTRACT

A bicycle hub includes a hub shell body and a plurality of spoke mounting projections. The spoke mounting projections are disposed at one end portion of the hub shell body. Each of the spoke mounting projections includes a first circumferential side and a second circumferential side. The first circumferential side has a first spoke outlet for a first spoke and a second spoke outlet for a second spoke. The second circumferential side is opposite to the first circumferential side.

17 Claims, 6 Drawing Sheets

1

BICYCLE HUB AND BICYCLE WHEEL

BACKGROUND

1. Field of the Invention

This invention generally relates to a bicycle hub. More specifically, the present invention relates to a bicycle hub with a plurality of spoke mounting projections.

2. Background Information

There are many different types of bicycle wheels, which are currently available on the market. Most bicycle wheels have a hub, a plurality of spokes and an annular rim. The hub is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The outer ends of the spokes typically are provided with threads for engaging spoke nipples, which secure the outer ends of the wire spokes to holes in the annular rim. Recently, bicycle wheels have been designed that use straight spokes. Since straight spokes do not have a bent inner end, the hub needs to be designed with special attachment structures for securing the inner end to the hub.

SUMMARY

It has been discovered that some of the hubs that are used with straight spokes can be expensive and/or complicated to manufacture due to the special attachment structures for securing the inner end to the hub shell or body. The special attachment structures sometimes causes the lateral spacing between the left side spokes and the right side spokes to be reduced, which can reduce the rigidity of the wheel in the lateral direction. Moreover, it has also been discovered that these types of wheels are not always as lightweight, as desired, due to these special attachment structures. Furthermore, it has been discovered that with these types of bicycle wheels, it can be difficult, complicated and/or expensive to replace a spoke or spokes.

The present disclosure is directed to various features of a bicycle hub for effectively arranging a plurality of spokes with a relatively simpler structure.

In view of the state of the known technology, a bicycle hub is provided that basically includes a hub shell body and a plurality of spoke mounting projections. The spoke mounting projections are disposed at one end portion of the hub shell body. Each of the spoke mounting projections includes a first circumferential side and a second circumferential side. The first circumferential side has a first spoke outlet for a first spoke and a second spoke outlet for a second spoke. The second circumferential side is opposite to the first circumferential side.

Other objects, features, aspects and advantages of the disclosed a bicycle hub will become apparent to those skilled in the art from the following detailed description, which, taken in conjunction with the annexed drawings, discloses preferred embodiments of the bicycle hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
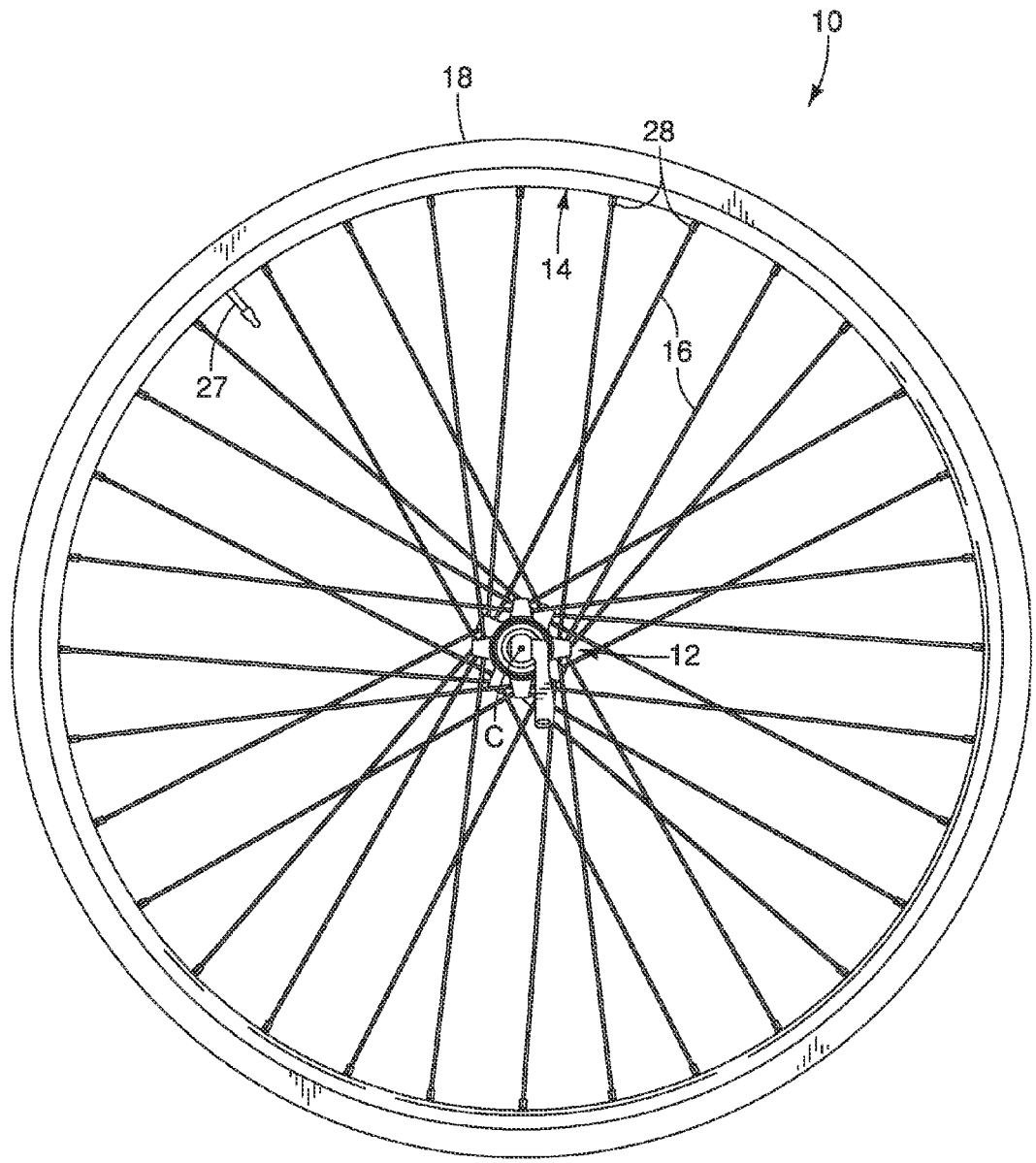
FIG. 1 is a side elevational view of a bicycle wheel with a rim, a plurality of spokes and a bicycle hub in accordance with a first embodiment.

Referring initially to FIG. 1, a tensioned spoke bicycle wheel 10 (e.g., a bicycle wheel) is illustrated in accordance with a first embodiment. The bicycle wheel 10 basically includes a center hub 12 (e.g., a bicycle hub), a wheel rim 14 (e.g., an annular rim), a plurality of spokes 16 and a pneumatic clincher tire 18. The hub 12 is connected to the rim 14 by the spokes 16, which are placed under tension. The clincher tire 18 is attached to the outer periphery of the rim 14. Thus, the bicycle wheel 10 rotates about a center rotational axis C of the hub 12. The rim 14, the spokes 16 and the tire 18 can be conventional parts, and thus, the spokes 16 and the tire 18 will only be briefly explained herein. The bicycle wheel 10 is a clincher tire wheel in which that an air tight chamber is formed between the outer surface of the rim 14 and the pneumatic tire 18. Of course, it will be apparent to those skilled in the art from this disclosure that the rim 14 could be adapted to a tubeless tire wheel as needed and/or desired. The bicycle wheel 10 is attached to a bicycle frame (not shown) in a conventional manner. Generally, the bicycle wheel 10 can be applied to the bicycle frame as a front wheel or a rear wheel.

In the illustrated embodiment, the spokes 16 are tangential tension spokes that connect the hub 12 to the rim 14. For example, sixteen of the spokes 16 extend generally tangentially from one side of the hub 12 to the rim 14, while the other sixteen spokes 16 extend generally tangentially from the other side of the hub 12 to the rim 14, as explained below. Also, in the illustrated embodiment, the hub 12 is a front hub (i.e. the hub 12 does not include one or more sprockets) that utilizes thirty-two tangential spokes 16 coupled to the rim 14 at spaced circumferential locations as seen in FIG. 1. Of course, it will be apparent to those skilled in the art from this disclosure that the hub 12 could be applied as a rear hub for a rear wheel. Also, it will be apparent to those skilled in the art from this disclosure that the rim 14 could be modified to accommodate different spoking arrangements (e.g., such as that in which some spokes are tangential spokes and some are radial spokes, instead of that in which all spokes are tangential spokes) without departing from the scope of the present invention. Furthermore, it will also be apparent to those skilled in the art from this disclosure that the rim 14 could be modified to accommodate fewer or more thirty-two spokes if needed and/or desired. In any case, the spokes 16 are preferably coupled to the annular rim 14 in a circumferentially spaced arrangement.

Figure 2:
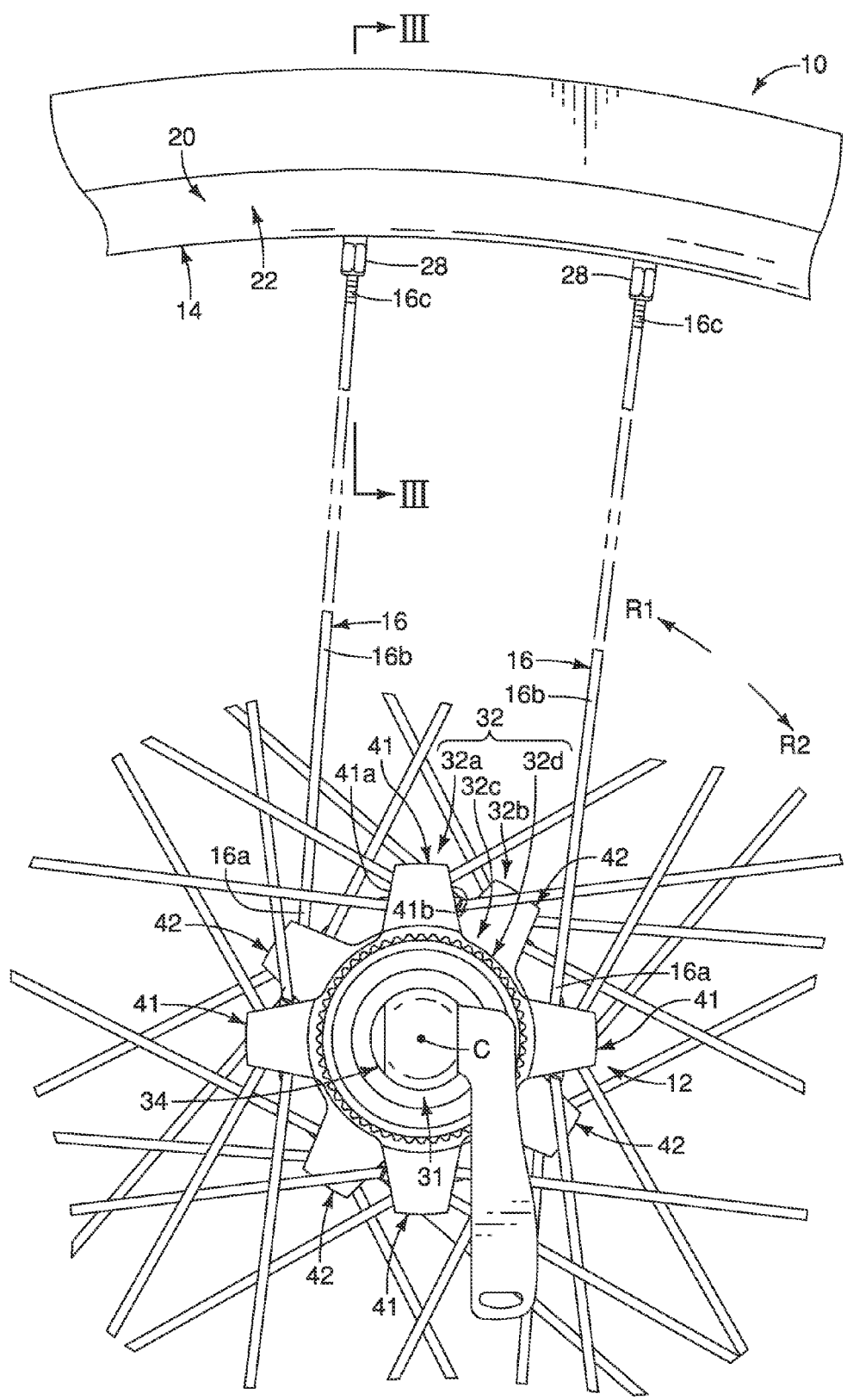
FIG. 2 is a partial side elevational view of the bicycle wheel illustrated in FIG. 1.
Figure 3:
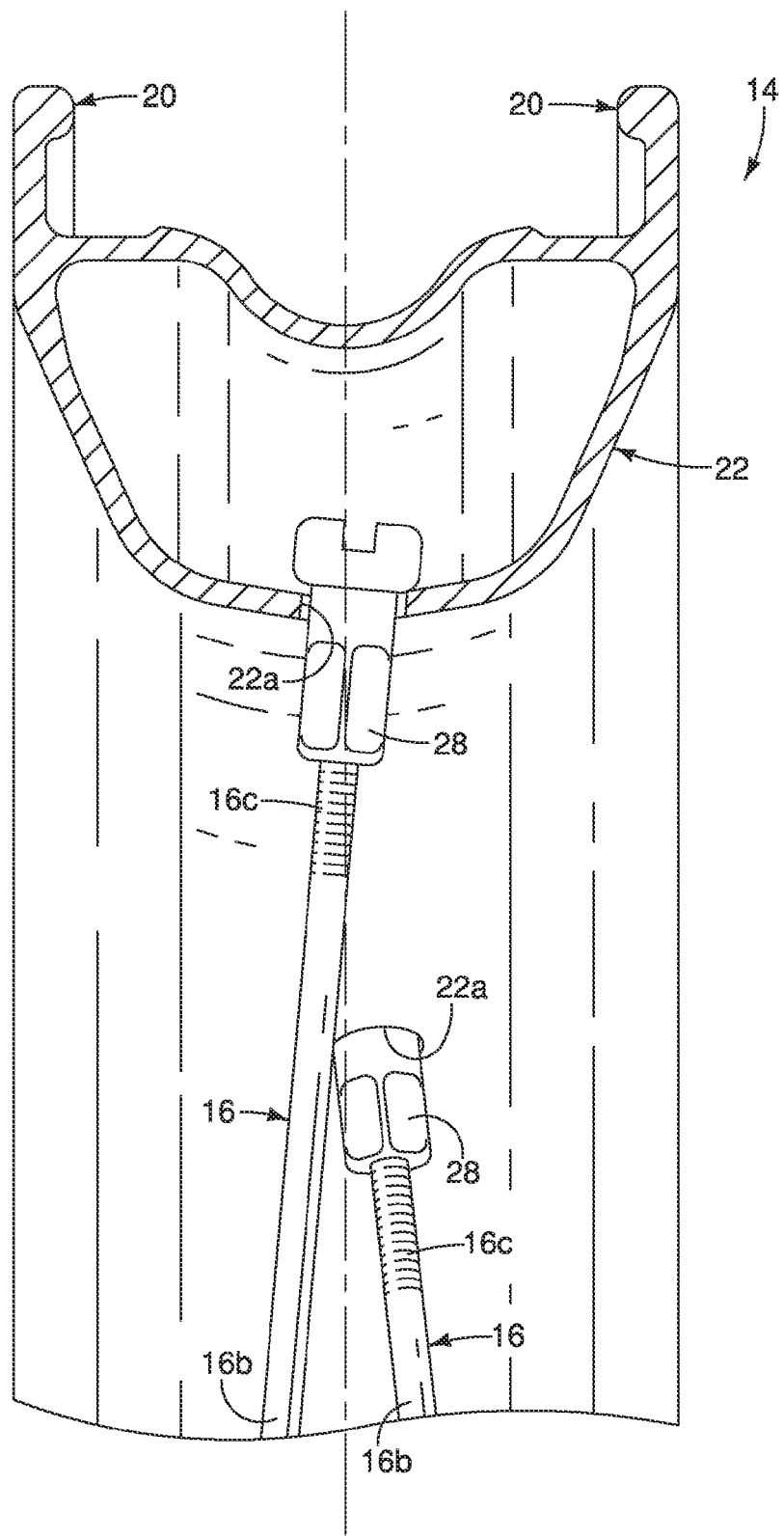
FIG. 3 is an enlarged cross sectional view of a portion of the bicycle wheel taken along III-III line in FIG. 2.

As seen in FIGS. 1 to 3, the rim 14 is an annular member that is designed for rotation about the center rotational axis C. The rim 14 is typically a metal extrusion that is butted into its self to form a hoop. However, the rim 14 can be constructed of a wide variety of substantially rigid material, such as those materials that are well known in the art. For example, the rim 14 can be constructed of any suitable metallic material, such as plated steel, stainless steel, aluminum, magnesium or titanium, as well as other non-metallic materials, such as a carbon fiber composite. Preferably, the rim 14 is constructed of an aluminum alloy. However, the rim 14 can also be a composite structure in which an aerodynamic carbon hoop bonded to an aluminum rim.

The construction of the clincher rim 14 will now be discussed in more detail. Referring to FIGS. 1 to 3, the rim 14 is substantially circular as seen in side elevation (FIG. 1). Basically, the rim 14 has a uniform cross-sectional profile, except for the absence of material for accommodating an air valve 27 and attachment of the spokes 16. As seen in FIGS. 2 and 3, the rim 14 basically includes an annular tire mounting part 20 and an annular spoke mounting part 22. In the illustrated embodiment, the annular tire mounting part 20 and the annular spoke mounting part 22 are formed as a one-piece, unitary member from a suitable metal such as an aluminum alloy. The annular tire mounting part 20 has a single air valve mounting opening (not shown) for attaching the air valve 27. The annular spoke mounting part 22 also has a single air valve through opening (not shown) for receiving the air valve 27 therethrough. The annular spoke mounting part 22 has a plurality of (thirty-two in the illustrated embodiment) spoke openings 22a that corresponds to the number of the spokes 16. In the illustrated embodiment, the spoke openings 22a are circular openings for receiving spoke nipples or plugs 28 by which the rim 14 is attached to the spokes 16 in a conventional manner. In the illustrated embodiment, alternating ones of the spoke openings 22a are preferably slightly angled in opposite axial directions relative to a rim center plane so that the spokes 16 coupled thereto extend to opposite ends of the hub 12. Preferably, the spokes 16 are coupled between the hub 12 and the rim 14 so that the bicycle wheel 10 is dished, i.e., the rim 14 is offset from the center of the hub 12 towards the end of a hub shell or body 32 (e.g., a hub shell body) that has a brake mounting portion 32d. Of course, it will be apparent to those skilled in the art from this disclosure that the spoke openings 22a could be sized such that each of the spoke openings 22a receives a reinforcement as needed and/or desired. Also the reinforcements could be a threaded type reinforcement or a non-threaded type reinforcement (e.g., an eyelet) as needed and/or desired. Of course, it will be apparent to those skilled in the art from this disclosure that the bicycle wheel 10 could have other types of conventional rims.

The spokes 16 will now be further explained with reference to FIGS. 1 to 3. In the illustrated embodiment, the spokes 16 are straight spokes that are all identical to each other. The spokes 16 are preferably integrally formed as a one-piece, unitary single member (integral member) using conventional manufacturing techniques. In the illustrated embodiment, the spokes 16 are tangential spokes that connect the hub 12 to the rim 14. The spokes 16 are aligned along a circumferential direction at intervals along the rim 14. Each spoke 16 basically includes an inner end 16a (e.g., an end), an elongated center part 16b and an outer end 16c. Each of the inner ends 16a of the spokes 16 has a flange or enlarged head part 16d (see FIG. 6) for engaging with the hub 12. The flange 16d is formed in the shape of a nail head. Each of the outer ends 16c of the spokes 16 has a thread for threadedly receiving the spoke nipple 28. The inner ends 16a of the spokes 16 are secured to the hub 12, while the outer ends 16c of the spokes 16 are fixedly coupled to the rim 14. In the embodiment illustrated, a total of thirty-two tangential spokes 16 are used. Naturally, it will be apparent to those skilled in the bicycle field from this disclosure that the bicycle wheel 10 can have fewer or more spokes and/or a different spoking arrangement. The spokes 16 are wire-type spokes that are relatively conventional. Thus, the spokes 16 will not be discussed and/or illustrated in detail herein, except as related to the hub 12.

Referring to FIGS. 2 and 4 to 7, the hub 12 will now be discussed in more detail. The hub 12 basically includes an axle 31 and the hub shell 32. The hub shell 32 is disposed about the axle 31 in a rotatable manner by a pair of bearings in a conventional manner. The other parts of the hub 12 other than the hub shell 32 are relatively conventional. Thus, these other parts of the hub 12 will not be discussed or illustrated in detail herein. In the embodiment illustrated, the hub 12 is a front bicycle hub. However, it will be apparent to those skilled in the bicycle field from this disclosure that the hub 12 can be replaced with a rear hub, as needed and/or desired.

Figure 4:
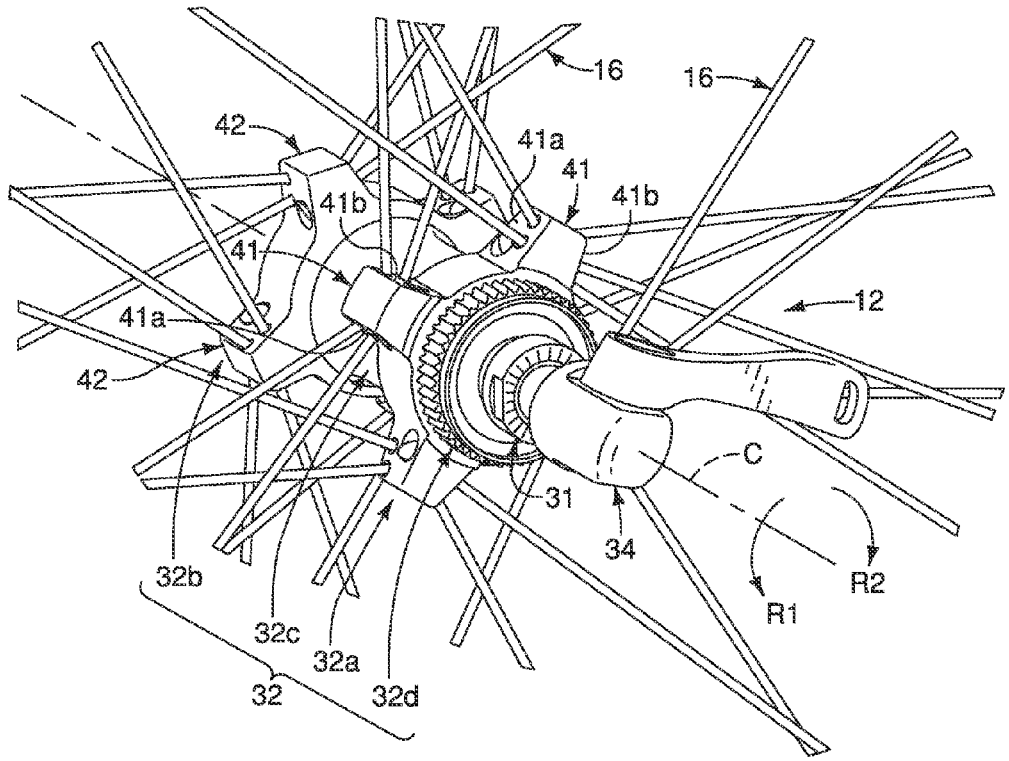
FIG. 4 is an enlarged partial perspective view of the spokes and the bicycle hub of the bicycle wheel illustrated in FIG. 1.
Figure 5:
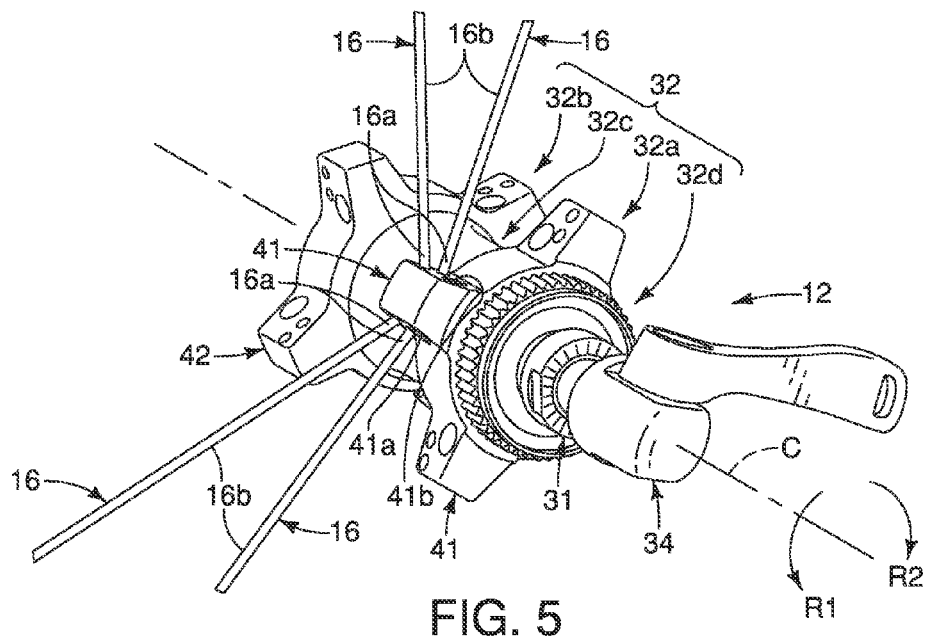
FIG. 5 is an enlarged partial perspective view of the spokes and the bicycle hub of the bicycle wheel illustrated in FIG. 1, with the spokes attached to only one of spoke mounting projections of the bicycle hub.

The axle 31 is a hard rigid member. The axle 31 has a pair of opposite free ends (only one is shown in FIGS. 4 and 5) extending outwardly from the hub shell 32. The free ends of the axle 31 are fixedly coupled the bicycle frame via a quick release device 34 in a conventional manner. The axle 31 has a center axis that defines the center rotational axis C of the bicycle wheel 10. Of course, it will be apparent to those skilled in the art from this disclosure that the axle 31 and the hub shell 32 can be modified to employ a conventional thru-axle system for coupling the bicycle wheel 10 to the bicycle frame.

As best seen in FIG. 4, the hub shell 32 is a hard rigid tubular member that is rotatably supported on the axle 31. The hub shell 32 includes a first spoke mounting portion 32a, a second spoke mounting portion 32b and a tubular center portion 32c disposed between the first and second spoke mounting portions 32a and 32b. Thus, the first and second spoke mounting portions 32a and 32b are disposed at opposite ends of the hub shell 32. The first and second spoke mounting portions 32a and 32b are configured and arranged to fixedly secure the spokes 16 thereto. The first and second spoke mounting portions 32a and 32b are preferably mirror images of each other as shown, except that the first spoke mounting portion 32a is circumferentially offset from the second spoke mounting portion 32b. In other words, the spoke mounting points of the first spoke mounting portion 32a are offset in the circumferential direction from the spoke mounting points of the second spoke mounting portion 32b. Of course, the first and second spoke mounting portions 32a and 32b do not need to be mirror images of each other if needed and/or desired. Optionally, in the illustrated embodiment, the hub shell 32 is also provided with the brake mounting portion 32d for attaching a disc brake rotor (not shown). The optional disc brake rotor (not shown) can be attached to the hub shell 32 by a retaining or locking ring that is threaded into on the end of the hub shell 32 in a conventional manner.

The first spoke mounting portion 32a includes a plurality (four in the illustrated embodiment) of individual spoke fixing parts or protrusions 41 (e.g., spoke mounting projections) that extend outwardly in a radial manner from one end (e.g., one end portion) of the hub shell 32. The spoke fixing parts 41 are equally spaced apart in a circumferential direction around the main body of the first spoke mounting portion 32a. Each of the spoke fixing parts 41 is configured and arranged to fix four of the spokes 16 thereto. Each of the spoke fixing parts 41 is preferably identical as shown. Of course, the spoke fixing parts 41 do not need to be identical if needed and/or desired.

Likewise, the second spoke mounting portion 32b includes a plurality (four in the illustrated embodiment) of individual spoke fixing parts or protrusions 42 (e.g., spoke mounting projections) that extend outwardly in a radial manner from the other end of the hub shell 32. The spoke fixing parts 42 are equally spaced apart in a circumferential direction around the main body of the second spoke mounting portion 32b. The spoke fixing parts 42 are preferably offset mirror images of the spoke fixing parts 41. In other words, the spoke fixing parts 42 are circumferentially offset from the spoke fixing parts 41 by an acute angle and face in the opposite axial direction from the spoke fixing parts 41 as seen in FIGS. 4 and 5. Each of the spoke fixing parts 42 is configured and arranged to fix four of the spokes 16 thereto. Each of the spoke fixing parts 42 is preferably identical as shown. Of course, the spoke fixing parts 42 do not need to be identical if needed and/or desired.

Thus, the spoke fixing parts or protrusions 41 and 42 of the hub shell 32 are individual radial projections that are circumferentially spaced apart about opposite ends of the hub shell 32. Since the spoke fixing parts 41 and 42 are identically configured and dimensioned, except for orientation, only the spoke fixing parts 41 on the first spoke mounting portion 32a of hub shell 32 will be discussed and/or illustrated in detail.

Figure 6:
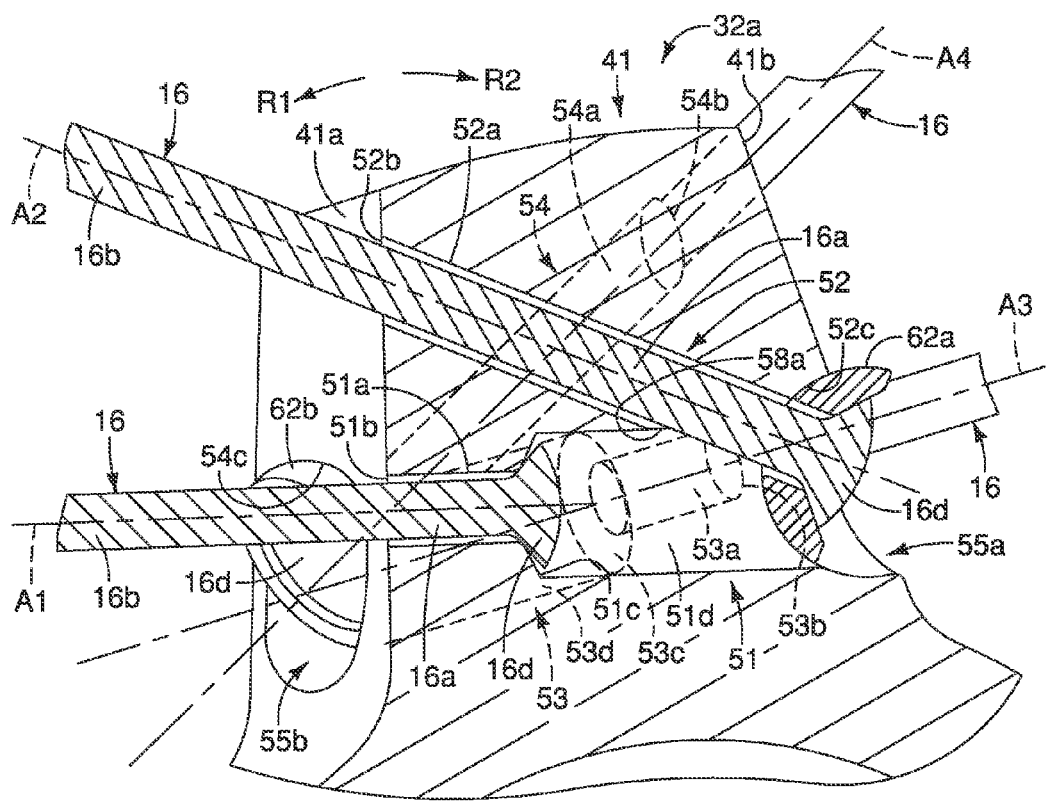
FIG. 6 is an enlarged partial cross sectional view of the spokes and the bicycle hub of the bicycle wheel illustrated in FIG. 1, illustrating the spokes attached to one of the spoke mounting projections of the bicycle hub.
Figure 7:
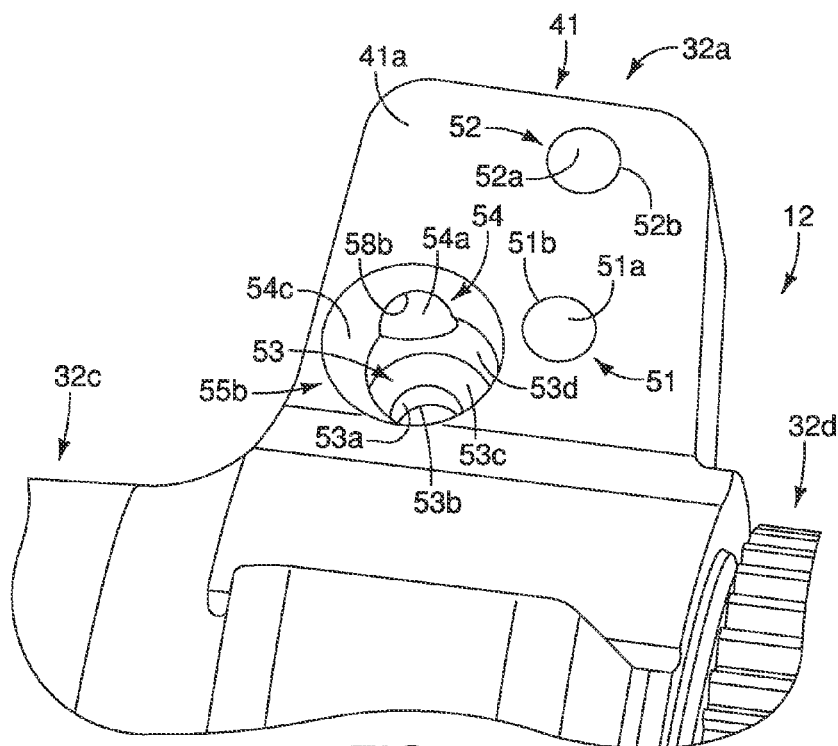
FIG. 7 is an enlarged partial perspective view of the bicycle hub of the bicycle wheel illustrated in FIG. 1, with the spokes removed from the bicycle hub.

As shown in FIGS. 5 to 7, each of the spoke fixing parts 41 of the hub shell 32 basically includes first and second spoke attachment sections 51 and 52 for attaching two of the spokes 16 (e.g., first and second spokes), respectively. The two of the spokes 16 attached to the first and second spoke attachment sections 51 and 52 are hereinafter referred to as first and second spokes 16, respectively. In the illustrated embodiment, the first and second spokes 16 attached to the first and second spoke attachment sections 51 and 52 longitudinally extend from the hub 12 to the rim 14 towards the same side or same circumferential direction (e.g., the counterclockwise direction R1 in FIGS. 4 and 5) with respect to the respective one of the spoke fixing parts 41. In the illustrated embodiment, each of the spoke fixing parts 41 of the hub shell 32 includes third and fourth spoke attachment sections 53 and 54 for attaching two of the spokes 16 (e.g., third and fourth spokes), respectively. The two of the spokes 16 attached to the third and fourth spoke attachment sections 53 and 54 are hereinafter referred to as third and fourth spokes 16, respectively. In the illustrated embodiment, the third and fourth spokes 16 attached to the third and fourth spoke attachment sections 53 and 54 longitudinally extend from the hub 12 to the rim 14 towards the same side or same circumferential direction (e.g., the clockwise direction R2 in FIGS. 4 and 5) with respect to the respective one of the spoke fixing parts 41. Thus, in the illustrated embodiment, each of the spoke fixing parts 41 has the first to fourth spoke attachment sections 51, 52, 53 and 54 for attaching four of the spokes 16 thereto.

In the illustrated embodiment, as best shown in FIG. 7, the first and second spoke attachment sections 51 and 52 are radially aligned with respect to a radial direction of the center rotational axis C, while the third and fourth spoke attachment sections 53 and 54 are radially aligned with respect to the radial direction of the center rotational axis C. Furthermore, the first and second spoke attachment sections 51 and 52 are spaced away from the third and fourth spoke attachment sections 53 and 54 in a direction parallel to the center rotational axis C. On the other hand, the first and third spoke attachment sections 51 and 53 are identically configured and dimensioned, except for orientation, while the second and fourth spoke attachment sections 52 and 54 are identically configured and dimensioned, except for orientation. Furthermore, the arrangement of the first and second spoke attachment sections 51 and 52 are identical to the arrangement of the third and fourth spoke attachment sections 53 and 54, except for the orientation. In the illustrated embodiment, the first and second spoke attachment sections 51 and 52 are arranged with respect to the third and fourth spoke attachment sections 53 and 54 in a rotational symmetric manner about a radial direction of the center rotational axis C. Each of the first to fourth spoke attachment sections 51 to 54 is formed as a stepped bore extending through the respective one of the spoke fixing parts 41 between first and second circumferential surfaces 41a and 41b (e.g., first and second circumferential sides) of the respective one of the spoke fixing parts 41. In the illustrated embodiment, the first circumferential surface 41a faces towards the counterclockwise direction R1 with respect to the center rotational axis C. The first circumferential surface 41a defines a first circumferential side of the present application. On the other hand, the second circumferential surface 41b faces towards the clockwise direction R2 with respect to the center rotational axis C. The second circumferential surface 41b defines a second circumferential side of the present application that is opposite to the first circumferential side.

Referring to FIGS. 6 and 7, the configurations of the first and second spoke attachment sections 51 and 52 will be discussed in detail. In the illustrated embodiment, as illustrated in FIG. 6, the first and second spoke attachment sections 51 and 52 includes first and second spoke receiving bores 51a and 52a (e.g., first and second spoke outlets), respectively, in the first circumferential surface 41a. The first and second spoke receiving bores 51a and 52a have first and second spoke exit openings 51b and 52b, respectively, in the first circumferential surface 41a. In the illustrated embodiment, the first and second spoke attachment sections 51 and 52 further includes first and second spoke abutments 51c and 52c, respectively.

As illustrated in FIGS. 6 and 7, the first and second spoke receiving bores 51a and 52a are arranged for the first and second spokes 16 such that the first and second spokes 16 extend through the first and second spoke receiving bores 51a and 52a, respectively. The first and second spokes 16 extend out from the first and second spoke exit openings 51b and 52b in the first circumferential surface 41a, respectively. In the illustrated embodiment, the first and second spoke receiving bores 51a and 52a are radially aligned with respect to a radial direction of the center rotational axis C of the hub shell 32. The first and second spoke receiving bores 51a and 52a have first and second longitudinal axes A1 and A2, respectively. The first and second longitudinal axes A1 and A2 define first and second spoke axis of the first and second spokes 16, respectively. In the illustrated embodiment, the first and second longitudinal axes A1 and A2 of the first and second spoke receiving bores 51a and 52a extend non-parallel with respect to each other. In particular, the first and second spoke receiving bores 51a and 52a are arranged such that an angle between the first and second longitudinal axes A1 and A2 is less than 90 degrees. Furthermore, as illustrated in FIG. 7, in the illustrated embodiment, the first and second spoke receiving bores 51a and 52a are arranged such that the first and second spoke exit openings 51b and 52b of the first and second spoke receiving bores 51a and 52a are spaced apart from each other in the first circumferential surface 41a.

As illustrated in FIGS. 6 and 7, the first and second spoke abutments 51c and 52c are arranged for abutting the inner ends 16a of the first and second spokes 16, respectively. In the illustrated embodiment, the first and second spoke abutments 51c and 52c generally axially face away from the first and second spoke receiving bores 51a and 52a along the first and second longitudinal axes A1 and A2, respectively, towards the clockwise direction R2 with respect to the center rotational axis C. In other words, the first and second spoke receiving bores 51a and 52a longitudinally extend away from the first and second spoke abutments 51c and 52c, respectively, towards the counterclockwise direction R1 with respect to the center rotational axis C. In the illustrated embodiment, as shown in FIG. 6, the first spoke abutment 51c is circumferentially offset from the second spoke abutment 52c. In particular, the first spoke abutment 51c is disposed in the counterclockwise direction R1 with respect to the second spoke abutment 52c. The first spoke abutment 51c has a shape that matches with an outer shape of the flange 16d of the first spoke 16. In the illustrated embodiment, the first spoke abutment 51c has a conical end face that contacts with the flange 16d of the first spoke 16. On the other hand, the second spoke abutment 52c has a shape that matches with an outer shape of a first washer 62a (e.g., an intermediate member). The first washer 62a is disposed between the flange 16d of the second spoke 16 and the second spoke abutment 52c. In the illustrated embodiment, the second spoke abutment 52c has a partial spherical face that contacts with an outer spherical surface of the first washer 62a. The first washer 62a has an inner conical face that contacts with the flange 16d of the second spoke 16. Of course, it will be apparent to those skilled in the art from this disclosure that the flange 16d of the second spoke 16 could directly engages with the second spoke abutment 52c without the first washer 62a.

As shown in FIG. 6, the first and second spoke attachment sections 51 and 52 also includes a single spoke entrance opening 55a in the second circumferential surface 41b. The spoke entrance opening 55a communicates with both the first and second spoke receiving bores 51a and 52a. In the illustrated embodiment, as shown in FIG. 6, the spoke entrance opening 55a communicates with the first spoke receiving bore 51a via a spoke insertion bore 51d. The spoke insertion bore 51d is concentrically arranged relative to the first spoke receiving bore 51a with respect to the first longitudinal axis A1. In the illustrated embodiment, the first spoke receiving bore 51a is dimensioned to receive the first spoke 16. In particular, the first spoke receiving bore 51a has the width that is slightly larger than the diameter of the elongated center part 16b of the first spoke 16 and smaller than the diameter of the flange 16d of the first spoke 16. Furthermore, the spoke insertion bore 51d has the width that is larger than that of the first spoke receiving bore 51a. The first spoke abutment 51c is formed as a transition between the first spoke receiving bore 51a and the spoke insertion bore 51d. In the illustrated embodiment, the first spoke receiving bore 51a and the first spoke abutment 51c are concentric to the first longitudinal axis A1. On the other hand, the spoke entrance opening 55a communicates with the second spoke receiving bore 52a via a recess defined by the second spoke abutment 52c. The second spoke receiving bore 52a has an inner opening 58a in an inner peripheral face of the spoke insertion bore 51d, thereby connecting the first and second spoke receiving bores 51a and 52a within the respective one of the spoke fixing parts 41. In the illustrated embodiment, the second spoke receiving bore 52a is dimensioned to receive the second spoke 16. In particular, the second spoke receiving bore 52a has the width that is slightly larger than the diameter of the elongated center part 16b of the second spoke 16 and smaller than the diameter of the flange 16d of the second spoke 16. Furthermore, the second spoke abutment 52c has the width that is larger than that of the second spoke receiving bore 52a.

Referring to FIGS. 6 and 7, the configurations of the third and fourth spoke attachment sections 53 and 54 will be discussed. In the illustrated embodiment, the first and third spoke attachment sections 51 and 53 are identically configured and dimensioned, except for orientation, while the second and fourth spoke attachment sections 52 and 54 are identically configured and dimensioned, except for orientation.

As illustrated in FIGS. 6 and 7, the third and fourth spoke attachment sections 53 and 54 includes third and fourth spoke receiving bores 53a and 54a (e.g., third and fourth spoke outlets), respectively, in the second circumferential surface 41b. The third and fourth spoke receiving bores 53a and 54a have third and fourth spoke exit openings 53b and 54b, respectively, in the second circumferential surface 41b. In the illustrated embodiment, the third and fourth spoke attachment sections 53 and 54 further includes third and fourth spoke abutments 53c and 54c, respectively.

As illustrated in FIGS. 6 and 7, the third and fourth spoke receiving bores 53a and 54a are arranged for the third and fourth spokes 16 such that the third and fourth spokes 16 extend through the third and fourth spoke receiving bores 53a and 54a, respectively. The third and fourth spokes 16 extend out from the third and fourth spoke exit openings 53b and 54b in the second circumferential surface 41b, respectively. In the illustrated embodiment, the third and fourth spoke receiving bores 53a and 54a are radially aligned with respect to a radial direction of the center rotational axis C of the hub shell 32. The third and fourth spoke receiving bores 53a and 54a have third and fourth longitudinal axes A3 and A4, respectively. The third and fourth longitudinal axes A3 and A4 define third and fourth spoke axis of the third and fourth spokes 16, respectively. In the illustrated embodiment, the third and fourth longitudinal axes A3 and A4 of the third and fourth spoke receiving bores 53a and 54a extend non-parallel with respect to each other. In particular, the third and fourth spoke receiving bores 53a and 54a are arranged such that an angle between the third and fourth longitudinal axes A3 and A4 is less than 90 degrees. Furthermore, as illustrated in FIG. 6, in the illustrated embodiment, the third and fourth spoke receiving bores 53a and 54a are arranged such that the third and fourth spoke exit openings 53b and 54b of the third and fourth spoke receiving bores 53a and 54a are spaced apart from each other in the second circumferential surface 41b.

As illustrated in FIGS. 6 and 7, the third and fourth spoke abutments 53c and 54c are arranged for abutting the inner ends 16a of the third and fourth spokes 16, respectively. In the illustrated embodiment, the third and fourth spoke abutments 53c and 54c generally axially face away from the third and fourth spoke receiving bores 53a and 54a along the third and fourth longitudinal axes A3 and A4, respectively, towards the counterclockwise direction R1 with respect to the center rotational axis C. In other words, the third and fourth spoke receiving bores 53a and 54a longitudinally extend away from the third and fourth spoke abutments 53c and 54c, respectively, towards the clockwise direction R2 with respect to the center rotational axis C. In the illustrated embodiment, as shown in FIG. 6, the third spoke abutment 53c is circumferentially offset from the fourth spoke abutment 54c. In particular, the third spoke abutment 53c is disposed in the clockwise direction R2 with respect to the fourth spoke abutment 54c. The third spoke abutment 53c has a shape that matches with an outer shape of the flange 16d of the third spoke 16. In the illustrated embodiment, the third spoke abutment 53c has a conical end face that contacts with the flange 16d of the third spoke 16. On the other hand, the fourth spoke abutment 54c has a shape that matches with an outer shape of a second washer 62b (e.g., an intermediate member). The second washer 62b is disposed between the flange 16d of the fourth spoke 16 and the fourth spoke abutment 54c. In the illustrated embodiment, the fourth spoke abutment 54c has a partial spherical face that contacts with an outer spherical surface of the second washer 62b. The second washer 62b has an inner conical face that contacts with the flange 16d of the fourth spoke 16. Of course, it will be apparent to those skilled in the art from this disclosure that the flange 16d of the fourth spoke 16 could directly engages with the fourth spoke abutment 54c without the second washer 62b.

As shown in FIGS. 6 and 7, the third and fourth spoke attachment sections 53 and 54 also include a single spoke entrance opening 55b in the first circumferential surface 41a. The spoke entrance opening 55b communicates with both the third and fourth spoke receiving bores 53a and 54a. In the illustrated embodiment, as shown in FIG. 7, the spoke entrance opening 55b communicates with the third spoke receiving bore 53a via a spoke insertion bore 53d. The spoke insertion bore 53d is concentrically arranged relative to the third spoke receiving bore 53a with respect to the third longitudinal axis A3. In the illustrated embodiment, the third spoke receiving bore 53a is dimensioned to receive the third spoke 16. In particular, the third spoke receiving bore 53a has the width that is slightly larger than the diameter of the elongated center part 16b of the third spoke 16 and smaller than the diameter of the flange 16d of the third spoke 16. Furthermore, the spoke insertion bore 53d has the width that is larger than that of the third spoke receiving bore 53a. The third spoke abutment 53c is formed as a transition between the third spoke receiving bore 53a and the spoke insertion bore 53d. In the illustrated embodiment, the third spoke receiving bore 53a and the third spoke abutment 53c are concentric to the third longitudinal axis A3. On the other hand, the spoke entrance opening 55b communicates with the fourth spoke receiving bore 54a via a recess defined by the fourth spoke abutment 54c. The fourth spoke receiving bore 54a has an inner opening 58b in an inner peripheral face of the spoke insertion bore 53d, thereby connecting the third and fourth spoke receiving bores 53a and 54a within the respective one of the spoke fixing parts 41. In the illustrated embodiment, the fourth spoke receiving bore 54a is dimensioned to receive the fourth spoke 16. In particular, the fourth spoke receiving bore 54a has the width that is slightly larger than the diameter the elongated center part 16b of the fourth spoke 16 and smaller than the diameter of the flange 16d of the fourth spoke 16. Furthermore, the fourth spoke abutment 54c has the width that is larger than that of the fourth spoke receiving bore 54a.

In the illustrated embodiment, the first to fourth longitudinal axes A1 to A4 are slanted or angle relative to each other with respect to a plane that extends perpendicular to the center rotational axis C of the hub shell 32. The different angles of the first to fourth longitudinal axes A1 to A4 avoid interference between crossing pairs of the spokes 16.

In the illustrated embodiment, each of the spoke fixing parts 41 is configured and arranged to fix four of the spokes 16 thereto. Furthermore, each of the spoke fixing parts 42 is configured and arranged to fix four of the spokes 16 thereto. Thus, thirty-two of the spokes 16 can be effectively arranged to the hub 12. Furthermore, in the illustrated embodiment, the first and second spokes 16 are inserted into the first and second spoke receiving bores 51a and 52a, respectively, through the single spoke entrance opening 55a, while the third and fourth spokes 16 are inserted into the third and fourth spoke receiving bores 53a and 54a, respectively, through the single spoke entrance opening 55b. Since one opening for inserting the spokes 16 can be seen on the each of the first and second circumferential surfaces 41a and 41b from outside, an aesthetically improved hub 12 can be achieved. Furthermore, the second and fourth spokes 16 are coupled to the second and fourth spoke attachment sections 52 and 54 via first and second washers 62a and 62b, respectively. Thus, the loads applied to the hub 12 through the spokes 16 can be decreased.

Second Embodiment

Figure 8:
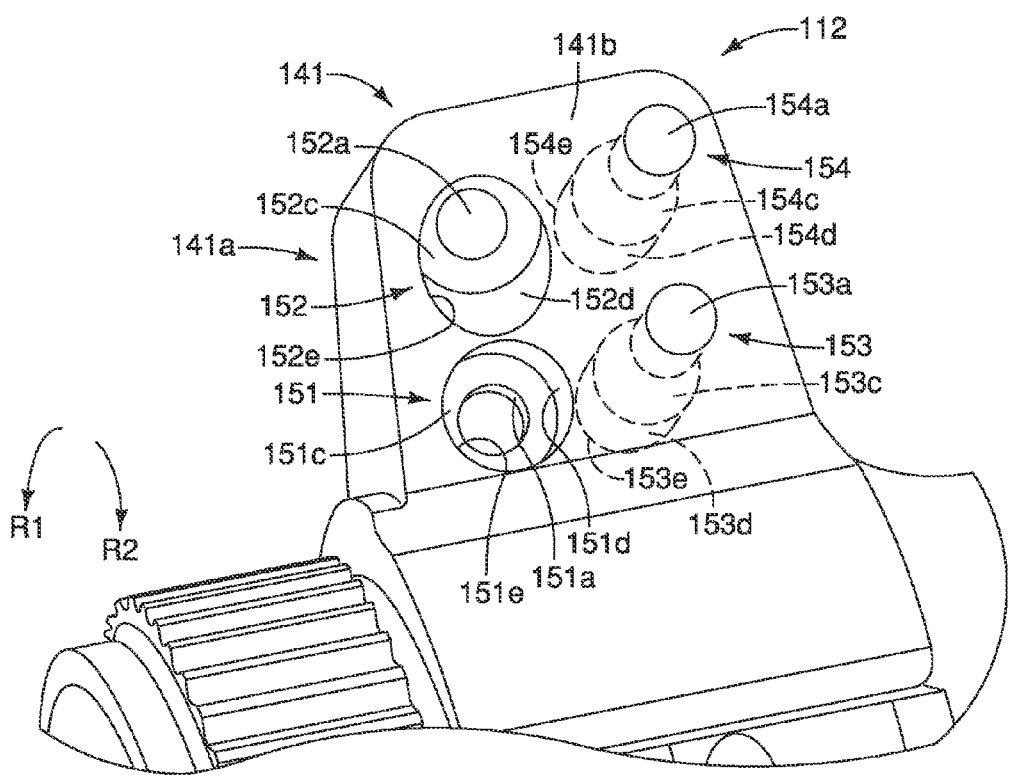
FIG. 8 is an enlarged partial perspective view of a bicycle hub in accordance with a second embodiment.

Referring now to FIG. 8, a center hub 112 (e.g., a bicycle hub) in accordance with a second embodiment will now be explained. The hub 112 is used with the rim 14 (e.g., an annular rim) and the spokes 16 to form the bicycle wheel 10 (e.g., a bicycle wheel) (see FIG. 1). In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "100" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

As illustrated in FIG. 8, the hub 112 in the second embodiment is basically identical to the hub 12 of the first embodiment, and the only difference between the first embodiment and the second embodiment is that first and second spoke attachment sections 151 and 152 has first and second spoke entrance openings 151e and 152e at spaced apart locations in a second circumferential surface 141b (e.g., a second circumferential side) of each of spoke fixing parts 141 (e.g., spoke mounting projections), while third and fourth spoke attachment sections 153 and 154 has third and fourth spoke entrance openings 153e and 154e at spaced apart locations in a first circumferential surface 141a (e.g., a first circumferential side) of each of the spoke fixing parts 141. In other words, in the illustrated embodiment, the first and second spoke attachment sections 151 and 152 do not have a common entrance opening for inserting the first and second spokes 16, while the third and fourth spoke attachment sections 153 and 154 do not have a common entrance opening for inserting the third and fourth spokes 16.

More specifically, the first and second spoke attachment sections 151 and 152 includes first and second spoke receiving bores 151a and 152a (e.g., first and second spoke outlets), first and second spoke abutments 151c and 152c, and first and second spoke insertion bores 151d and 152d, respectively. In the illustrated embodiment, the first spoke receiving bore 151a, the first spoke abutment 151c, and the first spoke insertion bore 151d are concentric to a longitudinal axis of the first spoke attachment section 151, while the second spoke receiving bore 152a, the second spoke abutment 152c, and the second spoke insertion bore 152d are concentric to a longitudinal axis of the second spoke attachment section 152. The first spoke abutment 151c is axially disposed between the first spoke receiving bore 151a and the first spoke insertion bore 151d along the longitudinal axis of the first spoke attachment section 151, while the second spoke abutment 152c is axially disposed between the second spoke receiving bore 152a and the second spoke insertion bore 152d along the longitudinal axis of the second spoke attachment section 152. Furthermore, in the illustrated embodiment, the first and second spoke abutments 151c and 152c are radially aligned with respect to a radial direction of a center rotational axis of the hub 112. The first and second spoke abutments 151c and 152c generally face towards the same circumferential side or direction with respect to the center rotational axis of the hub 112. Moreover, in the illustrated embodiment, the first spoke insertion bore 151d has a larger width than that of the first spoke receiving bore 1511a, while the second spoke insertion bore 152d has a larger width than that of the second spoke receiving bore 152a.

In the illustrated embodiment, the first and third spoke attachment sections 151 and 153 are identically configured and dimensioned, except for orientation, while the second and fourth spoke attachment sections 152 and 154 are identically configured and dimensioned, except for orientation. Furthermore, the arrangement of the first and second spoke attachment sections 151 and 152 are identical to the arrangement of the third and fourth spoke attachment sections 153 and 154, except for the orientation. In the illustrated embodiment, the first and second spoke attachment sections 151 and 152 are arranged with respect to the third and fourth spoke attachment sections 153 and 154 in a rotational symmetric manner about a radial direction of the center rotational axis of the hub 112.

Specifically, the third and fourth spoke attachment sections 153 and 154 includes third and fourth spoke receiving bores 153a and 154a (e.g., third and fourth spoke outlets), third and fourth spoke abutments 153c and 154c, and third and fourth spoke insertion bores 153d and 154d, respectively. In the illustrated embodiment, the third spoke receiving bore 153a, the third spoke abutment 153c, and the third spoke insertion bore 153d are concentric to a longitudinal axis of the third spoke attachment section 153, while the fourth spoke receiving bore 154a, the fourth spoke abutment 154c, and the fourth spoke insertion bore 154d are concentric to a longitudinal axis of the fourth spoke attachment section 154. The third spoke abutment 153c is axially disposed between the third spoke receiving bore 153a and the third spoke insertion bore 153d along the longitudinal axis of the third spoke attachment section 153, while the fourth spoke abutment 154c is axially disposed between the fourth spoke receiving bore 154a and the fourth spoke insertion bore 154d along the longitudinal axis of the fourth spoke attachment section 154. Furthermore, in the illustrated embodiment, the third and fourth spoke abutments 153c and 154c are radially aligned with respect to a radial direction of a center axis of the hub 112. The third and fourth spoke abutments 153c and 154c generally face towards the same circumferential side or direction with respect to the center rotational axis of the hub 112. Moreover, in the illustrated embodiment, the third spoke insertion bore 153d has a larger width than that of the third spoke receiving bore 153a, while the fourth spoke insertion bore 154d has a larger width than that of the fourth spoke receiving bore 154a.

Third Embodiment

Figure 9:
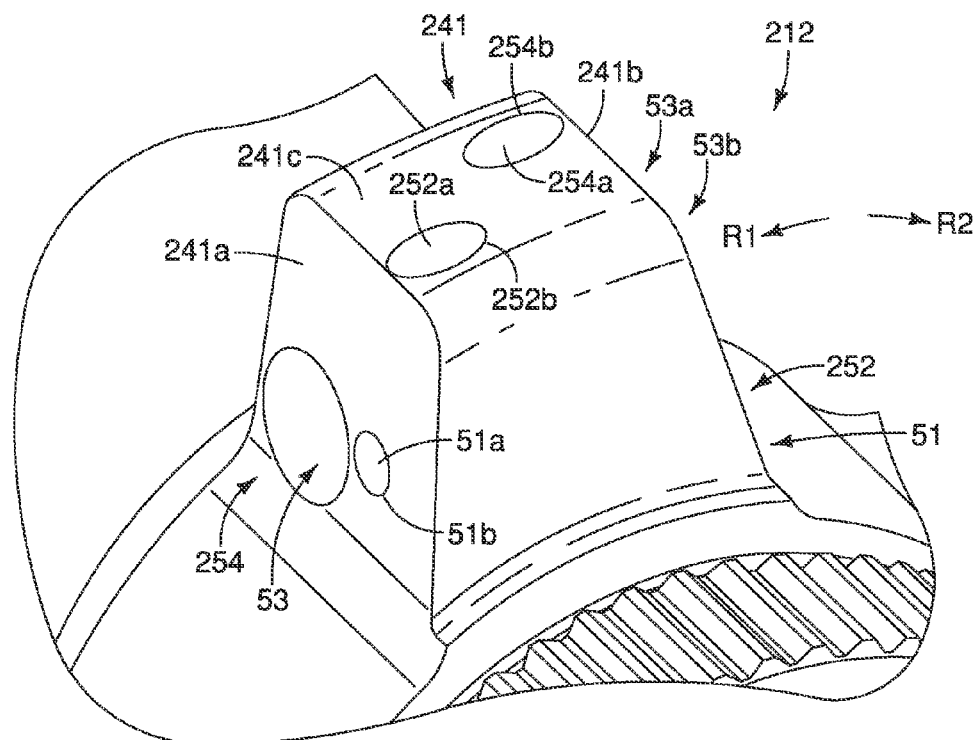
FIG. 9 is an enlarged partial perspective view of a bicycle hub in accordance with a third embodiment.

Referring now to FIG. 9, a center hub 212 (e.g., a bicycle hub) in accordance with a third embodiment will now be explained. The hub 212 is used with the rim 14 (e.g., an annular rim) and the spokes 16 to form the bicycle wheel 10 (e.g., a bicycle wheel) (see FIG. 1). In view of the similarity between the first and third embodiments, the parts of the third embodiment that are identical to the parts of the first embodiment will be given the same reference numerals as the parts of the first embodiment. Also, parts of this third embodiment that are functionally identical and/or substantially identical to parts of the first embodiment will be given the same reference numerals but with "200" added thereto. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

As illustrated in FIG. 9, the hub 212 in the third embodiment is basically identical to the hub 12 of the first embodiment, and the only difference between the first embodiment and the third embodiment is that a second spoke attachment section 252 has a second spoke exit opening 252b in a surface (e.g., a first circumferential side) other than a first circumferential surface 241a (e.g., a first circumferential side) of each of spoke fixing parts 241, and that a fourth spoke attachment section 254 has a fourth spoke exit opening 254b in a surface (e.g., a second circumferential side) other than a second circumferential surface 241b (e.g., a second circumferential side) of each of the spoke fixing parts 241.

In particular, as illustrated in FIG. 9, each of the spoke fixing parts 241 includes the first and third spoke attachment sections 51 and 53. The first spoke attachment section 51 has the first spoke receiving bore 51a (e.g., a first spoke outlet) with the first spoke exit opening 51b in the first circumferential surface 241a of the respective one of the spoke fixing parts 241. The second spoke attachment section 252 has a second spoke receiving bore 252a (e.g., a second spoke outlet) with the second spoke exit opening 252b in a surface other than the first circumferential surface 241a. In the illustrated embodiment, the second spoke attachment section 252 has the second spoke exit opening 252b in a radially outward surface 241c (e.g., a first circumferential side) of the respective one of the spoke fixing parts 241. The first and second spoke receiving bores 51a and the 252a are disposed in the counterclockwise direction R1 with respect to the second circumferential surface 241b. In other words, the first and second spoke receiving bores 51a and the 252a are disposed in a portion defining a first circumferential side of the respective one of the spoke fixing parts 241.

On the other hand, third spoke attachment section 53 has the third spoke receiving bore 53a (e.g., a third spoke outlet) with the third spoke exit opening 53b in the second circumferential surface 241b of the respective one of the spoke fixing parts 241. The fourth spoke attachment section 254 has a fourth spoke receiving bore 254a (e.g., a fourth spoke outlet) with the fourth spoke exit opening 254b in a surface other than the second circumferential surface 241b. In the illustrated embodiment, the fourth spoke attachment section 254 has the fourth spoke exit opening 254b in the radially outward surface 241c (e.g., a second circumferential side) of the respective one of the spoke fixing parts 241. The third and fourth spoke receiving bores 53a and the 254a are disposed in the clockwise direction R2 with respect to the first circumferential surface 241a. In other words, the third and fourth spoke receiving bores 53a and the 254a are disposed in a portion defining a second circumferential side of the respective one of the spoke fixing parts 241.

In the illustrated embodiment, the first and second circumferential sides of the present application can be construed as first and second halves of peripheral surfaces of each of the spoke fixing parts 241. In particular, the first half of the peripheral surfaces includes the first circumferential surface 241a and one bisection of the radially outward surface 241c that is disposed in the counterclockwise direction R1 with respect to the other bisection of the radially outward surface 241c. In other words, in the illustrated embodiment, the first circumferential surface 241a and the one bisection of the radially outward surface 241c define the first circumferential side of the present application. On the other hand, the second half of the peripheral surfaces includes the second circumferential surface 241b and the other bisection of the radially outward surface 241c. In other words, in the illustrated embodiment, the second circumferential surface 241b and the other bisection of the radially outward surface 241c define the second circumferential side of the present application. Of course, it will be apparent to those skilled in the art from this disclosure that the second and fourth spoke attachment sections 252 and 254 could be further modified to have the second and fourth spoke exit openings 252b and 254b in other surfaces (e.g., first and second circumferential sides) of the respective one of the spoke fixing parts 241, such as axial side faces of the respective one of the spoke fixing parts 241. Moreover, it will also be apparent to those skilled in the art from this disclosure that the first and third spoke attachment sections 51 and 53 could be further modified to have the first and third spoke exit openings 51b and 53b in surfaces (e.g., first and second circumferential sides) other than the first and second circumferential surfaces 241a and 241b, respectively.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially change its operation. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub comprising:
   a hub shell body; and
   a plurality of spoke mounting projections disposed at one end portion of the hub shell body, each of the spoke mounting projections including a first spoke receiving bore, a second spoke receiving bore, a first spoke abutment, a second spoke abutment, a first circumferential side facing one of a clockwise direction and a counterclockwise direction with respect to a center rotational axis of the bicycle hub, and a second circumferential side facing in an opposite direction from the first circumferential side, the first and second spoke abutments facing a direction towards the second circumferential side,
   the first circumferential side having a first spoke outlet for receiving a first spoke, the first spoke outlet having a first longitudinal axis extending through the first spoke receiving bore, the first spoke receiving bore extending from the first spoke outlet and having a first end adjacent the first spoke outlet and a second end adjacent the first spoke abutment that is for abutting an end of the first spoke,
   the first circumferential side further having a second spoke outlet for receiving a second spoke, the second spoke outlet having a second longitudinal axis extending through the second spoke receiving bore, the first and second longitudinal axes being non-parallel, the second spoke receiving bore extending from the second spoke outlet and having a first end adjacent the second spoke outlet and a second end adjacent the second spoke abutment that is for abutting an end of the second spoke.

2. The bicycle hub according to claim 1, wherein the first and second spoke outlets are radially aligned with respect to a radial direction of a center axis of the hub shell body.

3. The bicycle hub according to claim 1, wherein the first and second spoke abutments are radially aligned with respect to a radial direction of a center axis of the hub shell body.

4. The bicycle hub according to claim 1, wherein
the first spoke outlet and the first spoke abutment are concentric to the first longitudinal axis of the first spoke outlet.

5. The bicycle hub according to claim 1, wherein
the first spoke abutment is circumferentially offset from the second spoke abutment.

6. The bicycle hub according to claim 1, wherein
the second circumferential side has
a third spoke outlet for a third spoke, and
a fourth spoke outlet for a fourth spoke.

7. The bicycle hub according to claim 6, wherein
the third and fourth spoke outlets are radially aligned with respect to a radial direction of a center axis of the hub shell body.

8. The bicycle hub according to claim 6, wherein
each of the spoke mounting projections further includes
a third spoke abutment for abutting an end of the third spoke, and
a fourth spoke abutment for abutting an end of the fourth spoke.

9. The bicycle hub according to claim 8, wherein
the third and fourth spoke abutments are radially aligned with respect to a radial direction of a center axis of the hub shell body.

10. The bicycle hub according to claim 8, wherein
the third spoke outlet and the third spoke abutment are concentric to a longitudinal axis of the third spoke outlet.

11. The bicycle hub according to claim 8, wherein
the third spoke abutment is circumferentially offset from the fourth spoke abutment.

12. A bicycle wheel comprising:
an annular rim;
at least first and second spokes having inner ends and outer ends with the outer ends being fixedly coupled to the rim; and
a hub including a hub shell body with a plurality of spoke mounting projections, the spoke mounting projections being disposed at least one end of the hub shell body, at least one of the spoke mounting projections securing the inner ends of the first and second spokes to the hub, the at least one of the spoke mounting projections including a first spoke abutment, a second stoke abutment, a first circumferential side facing one of a clockwise direction and a counterclockwise direction with respect to a center rotational axis of the bicycle hub, and a second circumferential side facing in an opposite direction from the first circumferential side with respect to the center rotational axis the first and second spoke abutments facing a direction towards the second circumferential side,
the first circumferential side having a first spoke outlet for receiving the first spoke, the first spoke having an inner end abutting the first spoke abutment, the first spoke outlet having a first longitudinal axis, the first circumferential side further having a second spoke outlet for receiving the second spoke, the second spoke having an inner end abutting the second spoke abutment, the second spoke outlet having a second longitudinal axis, the first and second longitudinal axes being non-parallel.

13. The bicycle wheel according to claim 12, wherein
the first and second spoke outlets are radially aligned with respect to a radial direction of a center axis of the hub shell body.

14. The bicycle wheel according to claim 12, wherein
the first and second spoke abutments are radially aligned with respect to a radial direction of a center axis of the huh shell body.

15. The bicycle wheel according to claim 12, wherein
the first spoke abutment is circumferentially offset from the second spoke abutment.

16. The bicycle wheel according to claim 12, wherein
the first spoke has a first spoke axis, and
the second spoke has a second spoke axis,
an angle between the first and second spoke axis being less than 90 degree.

17. A bicycle hub comprising:
a hub shell body; and
a plurality of spoke mounting projections disposed at one end portion of the hub shell body, each of the spoke mounting projections including
a first circumferential side facing one of a clockwise direction and a counterclockwise direction with respect to a center rotational axis of the bicycle hub, the first circumferential side having a first spoke outlet for a first spoke, and a second spoke outlet for a second spoke, and
a second circumferential side facing in an opposite direction from the first circumferential side with respect to the center rotational axis, the second circumferential side including a spoke entrance opening configured to communicate with both the first and second spoke outlets.

* * * * *